United States Patent
Kruckemeyer et al.

(10) Patent No.: US 6,318,526 B1
(45) Date of Patent: Nov. 20, 2001

(54) COMPLIANT ROD GUIDE AND SEAL ASSEMBLY

(75) Inventors: William Charles Kruckemeyer, Beavercreek; Michael Leslie Oliver, Xenia, both of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/394,592

(22) Filed: Sep. 13, 1999

(51) Int. Cl.⁷ ................................ F16F 9/36; F16J 9/20
(52) U.S. Cl. .................. 188/322.17; 277/352; 277/353; 277/437; 277/439
(58) Field of Search .............. 188/322.16, 322.17; 277/352, 353, 437, 438, 439, 500, 549; 267/129

(56) References Cited

U.S. PATENT DOCUMENTS

| | | |
|---|---|---|
| 3,621,952 | 11/1971 | Long et al. . |
| 3,763,971 * | 10/1973 | Saner ................. 188/322.17 |
| 4,955,460 | 9/1990 | Lizell et al. . |
| 5,040,804 * | 8/1991 | Back ...................... 277/558 |
| 5,058,487 | 10/1991 | Faitel ...................... 92/167 |
| 5,176,229 | 1/1993 | Kanari et al. ............ 188/322.17 |
| 5,211,268 | 5/1993 | Lizell et al. . |
| 5,224,573 * | 7/1993 | Amemiya et al. ........ 188/322.17 |
| 5,275,387 | 1/1994 | Cotter et al. . |
| 5,332,234 * | 7/1994 | Forch et al. ............... 277/576 |
| 5,454,455 | 10/1995 | Kundmuller et al. ..... 188/322.16 |
| 5,584,368 | 12/1996 | Larsson ................... 188/322.17 |
| 5,706,920 | 1/1998 | Pees et al. ............... 188/322.17 |
| 5,794,743 | 8/1998 | Pradel et al. . |
| 6,105,739 * | 8/2000 | Deppert ................... 188/322.17 |

FOREIGN PATENT DOCUMENTS

| | | | |
|---|---|---|---|
| 2 092 262 * | 11/1982 | (GB) | ............. 188/322.17 |
| 31 17 493 * | 11/1982 | (DE) | ............. 188/322.17 |

* cited by examiner

Primary Examiner—Matthew C. Graham
Assistant Examiner—Thomas J. Williams
(74) Attorney, Agent, or Firm—Robert M. Sigler (57) ABSTRACT

A compliant rod guide and seal assembly for use in a damper includes an annular outer casing having a through hole and a support ring received in the outer casing. The support ring has an outer radius that is less than the inner radius of the outer casing such that a gap is formed between the support ring and the outer casing. The rod guide and seal assembly further includes a rod seal received in the support ring for receiving a rod therethrough, whereby the ring and seal can move laterally relative to the outer casing to accommodate lateral movement of the rod.

8 Claims, 6 Drawing Sheets

COMPLIANT ROD GUIDE AND SEAL ASSEMBLY

TECHNICAL FIELD

The present invention is directed to a rod guide and seal assembly for vibration damping devices, and more particularly, to a compliant rod guide and seal assembly for dampers used in shock absorbing systems.

BACKGROUND OF THE INVENTION

Shocks, struts and other damping devices are used in shock absorbing systems to dissipate vibrational and other forces. In vehicle shock absorbing systems, such damping devices are used to absorb shock loads sustained by the wheel assemblies of such vehicles and are used in combination with coil springs. Damping devices typically operate by transmitting the applied forces to a rod and piston combination slidably mounted in a fluid-filled chamber of an inner tube of the damper. As the piston is urged through the chamber, the fluid in the chamber is forced through and around the piston. The resistance of the piston to movement through the fluid in the chamber is directly proportional to the applied force. In this manner the movement of the rod and piston, and thereby the applied forces, are damped.

Strut or shock type dampers may include a rod guide assembly that guides and centers the rod and piston as they reciprocate within the inner tube. When lateral or "side load" forces are applied to the damper, the rod and piston may be shifted away from the radial center of the damper. Furthermore, deviations in tolerances in the various components of the damper can also shift the rod and piston off center. Radial misalignment of the rod and piston within the damper causes the rod to rub against the rod guide as it reciprocates within the inner tube, which increases wear on the rod and rod guide. This is especially undesirable in dampers containing magnetorheological fluid, the suspended magnetic particles of which can be abrasive to the rod. Furthermore, when the rod is laterally displaced, the rod can engage and laterally displace the rod guide, which in turn shifts the inner tube from the radial center of the damper. The shift in position of the inner tube increases wear upon various bearings, seals, and sleeve supports in the damper.

In order to prevent undue wear to a damper piston rod, some struts are provided with an outer tube bearing a bracket adjacent its lower end for attachment to a vehicle wheel suspension assembly and which is closed at its lower end by a strut base. One end of the piston rod is fixed to the middle of the strut base, and the rod projects upward into an inner tube containing the piston and fluid. The top of the inner tube is fixed to the vehicle body, so that the rod and piston thus move axially together with the outer tube and wheel assembly in opposition to the inner tube and vehicle body. Side loads applied to the strut are received by bearing elements between the inner and outer tubes; and very little of these side loads are thus applied to the rod. But apparatus must be provided to close and seal the bottom of the inner tube against loss of working fluid; and this assembly must accommodate the stroking action of the rod therethrough. This apparatus includes a rod guide and seal assembly, which, although relieved of most of its side loads, still includes a bearing and seal in contact with the rod. The rod guide and seal assembly thus provides a third point of radial support for the rod between the point of attachment to the strut base at the bottom and the piston at the top. If manufacturing tolerances or other factors cause the rod guide to be laterally misaligned with these other supports, it may cause undesirable wear between itself and the rod. Accordingly, there is a need for a rod guide and seal assembly that can accommodate manufacturing tolerances in lateral alignment with other rod support apparatus while providing secure sealing around an axially moving rod to maintain the working fluid within the working chambers of the damper.

SUMMARY OF THE INVENTION

It is an object of the present invention to provide a compliant rod guide and seal assembly for a rod and piston damping device that can accommodate lateral misalignment with respect to the rod without increasing the wear upon the rod and other damper components, and a compliant rod guide and seal assembly which is sufficiently rugged and durable to be used in automotive applications. When incorporated in a strut or other damper, the compliant rod guide and seal assembly can move laterally relative to the inner tube to align with other rod support members. The rod bearing and seal in the guide are thus able to operate as designed with minimum friction and wear. In a preferred embodiment, the compliant rod guide and seal assembly includes an annular outer casing defining a through hole, and a support ring received in the outer casing. The support ring has an outer radius that is less than the inner radius of the outer casing such that a gap is formed between the support ring and the outer casing. The rod guide and seal assembly further includes a rod seal mounted in the support ring which is shaped to receive and form a seal with a rod extending therethrough. The ring and seal can move radially relative to the outer casing to accommodate lateral movement of the rod.

Other objects and advantages of the present invention will be apparent from the following description, the accompanying drawings and the appended claims.

DESCRIPTION OF THE PREFERRED EMBODIMENT

Figure 1:
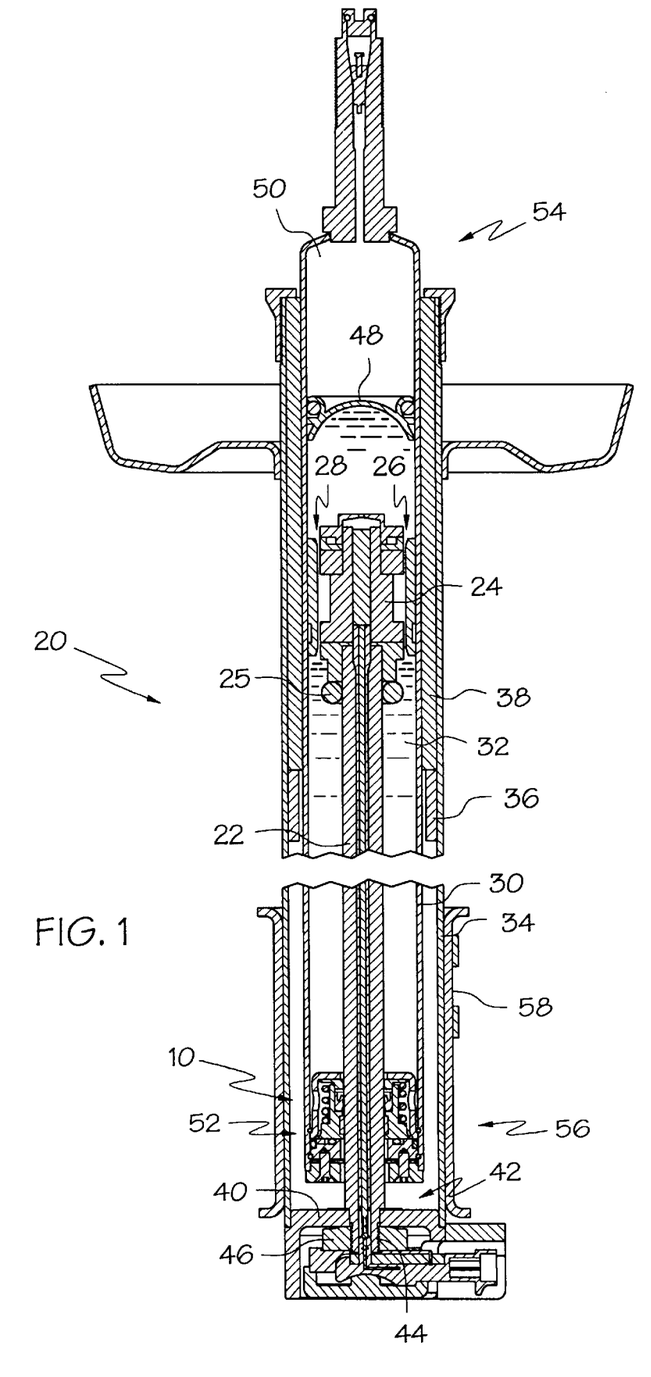
FIG. 1 is a side elevation in section of a damper having a preferred embodiment of the compliant rod guide and seal assembly of the present invention.

As shown in FIG. 1, an embodiment of the compliant rod guide and seal assembly 10 of the present invention is used in conjunction with a monotube strut 20. However, it should be understood that the compliant rod guide and seal assembly 10 of the present invention may also be used with certain shocks, as well as a variety of other applications beyond struts, shocks or dampers, and FIG. 1 is illustrative of a single application only. The strut 20 of FIG. 1 includes a rod 22 extending axially through the strut 20, and a piston 24 threaded onto an upper end of the rod. The piston 24 includes an annular bumper 25 and a pair of longitudinally-extending internal orifices 26, 28. The piston 24 and rod 22 are maintained inside a cylindrical inner tube 30 and are immersed in fluid 32 that fills the inner tube 30.

The inner tube 30 is received in and is axially moveable relative to an outer tube 34. A bearing sleeve support (shown schematically at 36) and a set of monotube seals and bearings (shown schematically at 38) guide the relative movement between the inner tube 30 and the outer tube 34. A generally cylindrical strut base 40 is connected to an open lower end 42 of the outer tube 34.

The rod 22 includes a threaded connector end 44 that extends through the strut base 40, and a nut 46 is threaded on the connector end 44 to couple the rod 22 to the strut base 40. Thus, when the outer tube 34 moves relative to the inner tube 30, the rod 22 and piston 24 move axially within the inner tube 30. The strut 20 includes a slidable gas cup 48 located in the inner tube 30, and the gas cup seals a pressure cavity 50 in the inner tube 30 that is filled with pressurized gas, such as nitrogen. The rod guide and seal assembly 10 is located adjacent to the lower end 52 of the inner tube 30 and receives the rod 22 therethrough. The rod guide and seal assembly 10 guides the relative movement between the inner tube 30 and the rod 22.

The upper end 54 of the inner tube 30 is connected to the frame (not shown) of a vehicle and the lower end 56 of the outer tube 34 is connected to the vehicle wheel suspension assembly (not shown) by a bracket 58. Accordingly, when the wheel suspension assembly transmits a shock load to the bracket 58, and thereby to the outer tube 34, the outer tube, rod 22 and piston 24 are axially moved upwardly (as shown in FIG. 1) relative to the inner tube 30. The movement of the piston 24 within the inner tube 30 forces fluid 32 through the orifices 26, 28 in the piston, which damps the movement of the piston, rod 22 and outer tube 34. As the piston 24 moves within the inner tube 30, the gas cup 48 also moves within the inner tube 30 to accommodate the change in volume in the inner tube 30 as the rod 22 is urged into or withdrawn from the innertube 30.

Figure 2:
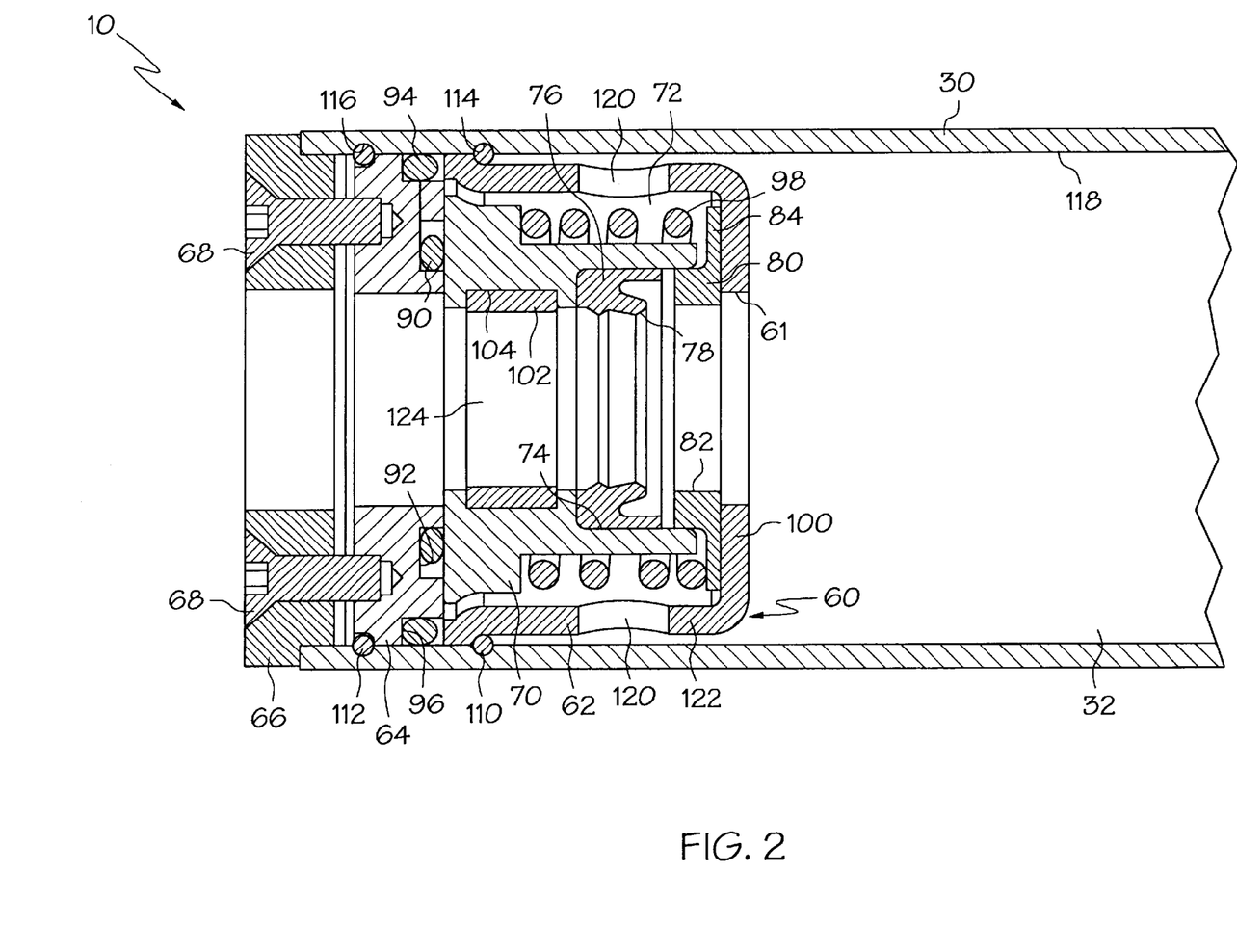
FIG. 2 is a detail side view in section of the compliant rod guide and seal assembly of FIG. 1.
Figure 3:
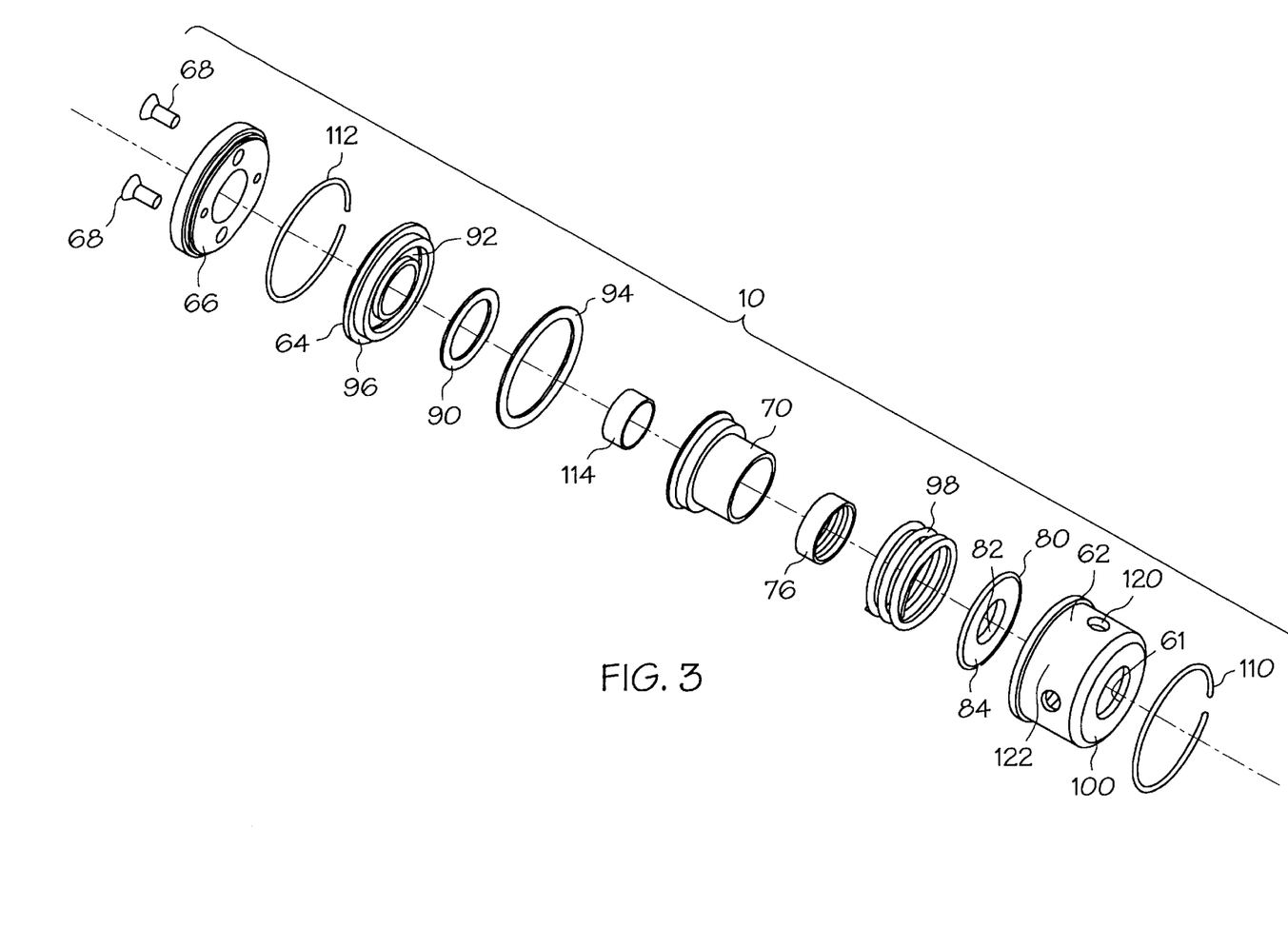
FIG. 3 is an exploded, perspective view of the compliant rod guide and seal assembly of FIG. 2.
Figure 4:
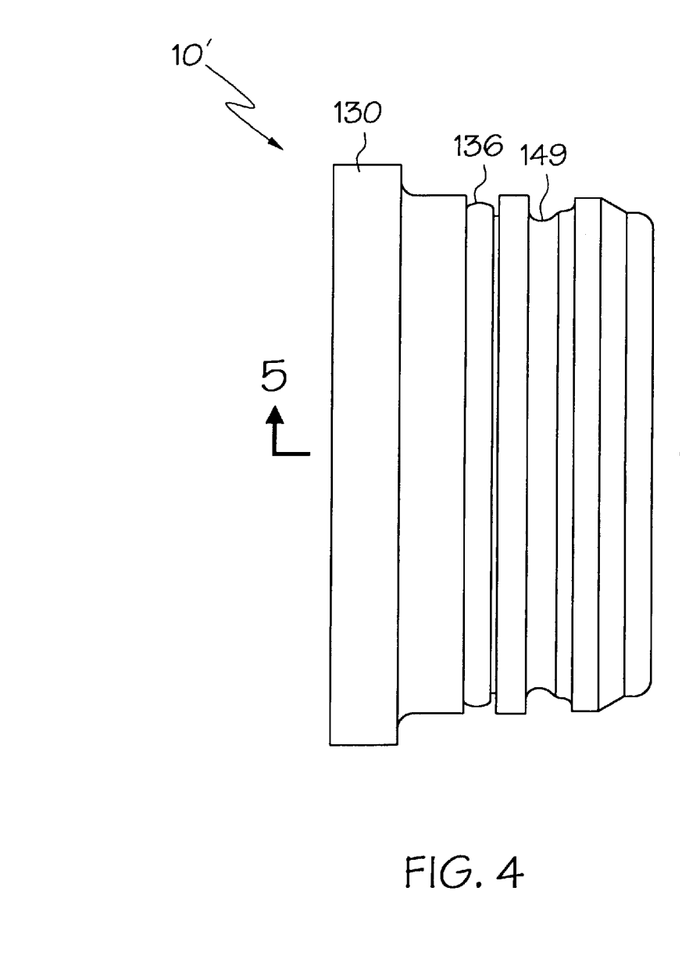
FIG. 4 is a side view of an alternate embodiment of the compliant rod guide and seal assembly of the present invention.
Figure 5:
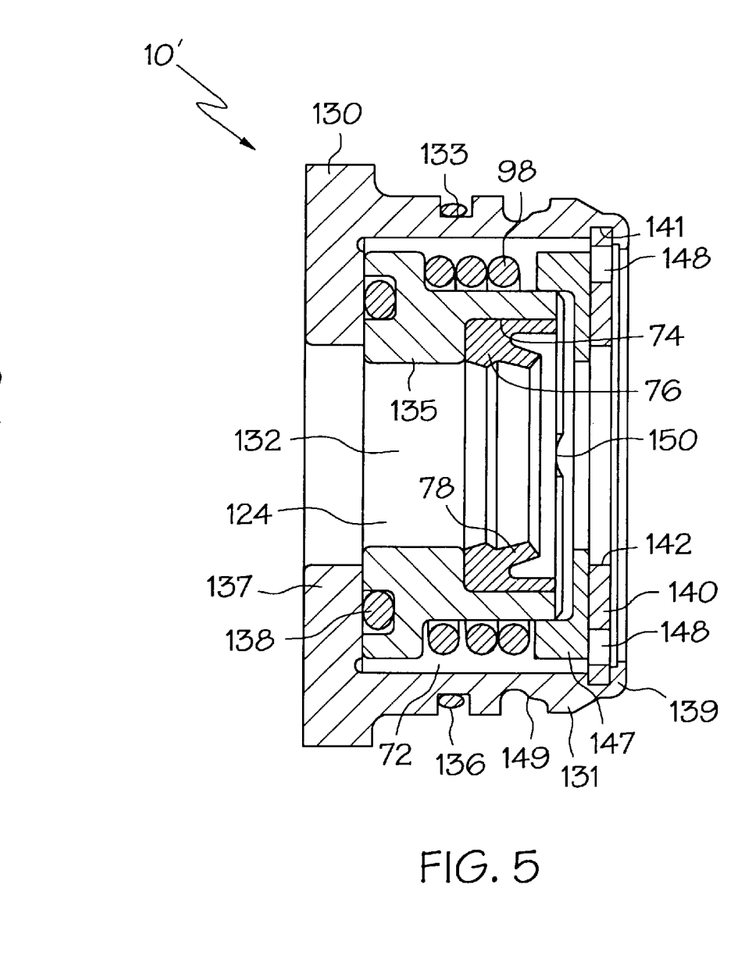
FIG. 5 is a section taken at line 5—5 of FIG. 4.

The rod guide and seal assembly 10 is shown in greater detail in FIGS. 2 and 3. Assembly 10 includes an outer casing 60 having a central hole 61 shaped to receive the rod 22 (see FIG. 1) therethrough. The diameter of the hole 61 is greater than the diameter of the shaft 22 to provide sufficient clearance between the outer casing 60 and shaft to allow for slight relative lateral movement of the shaft. The outer casing 60 includes a generally cup-shaped flask 62 (having the hole 61) and an annular seal cover 64. The seal cover 64 is attached to an annular bump plate 66 by a pair of cap screws 68. However, the bump plate 66 is optional and need not be included as part of the rod guide and seal assembly 10.

The rod guide and seal assembly 10 includes a support ring 70 that is received in the flask 62. The outer radius of the support ring 70 is less than the radius of the inner surface of the flask 62 such that a gap 72 is formed between the support ring and the flask. In a preferred embodiment, the gap 72 is about 1 mm about the support ring 70, but the gap 72 may range from about 0.1 mm to about 4 mm.

The support ring 70 includes an inner annular slot 74 for receiving an annular rod seal 76. The rod seal 76 includes an inwardly-extending flange 78 that is shaped to engage and form a seal with the rod 22 (see FIG. 1; not shown in FIGS. 2 and 3). A seal guard 80 is located between the outer casing 60 and the support ring 70, and includes a central opening 82 shaped to receive the rod therethrough, and a radially-outwardly extending flange portion 84. The seal guard 80 helps to protect the rod seal 76 and maintain the rod seal in place in assembly 10.

The seal cover 64 of the outer casing 60 forms a radially-inwardly extending portion of the outer casing 60 that engages the support ring 70 along its rear surface. An intermediate seal, such as an O-ring 90, is located between the support ring 70 and the seal cover 64 of the outer casing 60. The seal cover 64 includes an intermediate annular groove 92 to receive the intermediate seal 90. Assembly 10 also includes an outer seal, such as an O-ring 94, located between the seal cover 64 and the inner tube 30. The outer seal 94 is received in an outer annular groove 96 in the seal cover 64. The O-rings 90, 94 help to prevent fluid from leaking out of the assembly 10.

A coil spring 98 is coaxially mounted about the support ring 70, and the spring 98 is in a state of compression to urge the flask 62 and support ring 70 in opposite directions. In this manner the spring 98 urges the support ring 70 against the seal cover 64 of the outer casing 60 to ensure a proper seal therewith. The outer casing 60 includes an inwardly-extending lip 100 that acts as a retainer to keep the seal guard 80, support ring 70 and spring 98 within the outer casing 60. The rod guide and seal assembly 10 also includes a rod bearing 102 received in an inner annular groove 104 in the support ring 70. The rod bearing 102 guides relative rotational movement between the rod 22 and assembly 10. Alternately, the inner surface of the support ring 70 may be made of a lubricated material such that relative movement between the support ring 70 and rod 22 is sufficiently lubricated, in which case the rod bearing 102 is not needed.

A forward snap ring 110 and a rear snap ring 112 fix the location of the rod guide and seal assembly 10 relative to the inner surface 118 of the inner tube 30. The snap rings 110, 112 are in a state of radial compression, and are received in annular grooves 114, 116, respectively, formed in the inner surface 118 of the inner tube 30. In this manner, the forward snap ring 110 prevents movement of the rod guide and seal assembly 10 toward the piston 24, and the rear snap ring 112 prevents movement of the rod guide and seal assembly 10 away from the piston 24.

When the rod 22 (see FIG. 1) is received through the aligned holes in the flask 62, seal guard 80, support ring 70, rod seal 76, rod bearing 102, seal cover 64 and bump plate 68, the rod guide and seal assembly 10 is capable of accommodating relative lateral misalignment relative to the rod. The seal guard 80 and support ring 70, as well as the rod seal 76 and rod bearing 102 within the support ring, can laterally shift within the outer casing 60 to accommodate such movement; and this enables the support ring and seal guard to "float" within the outer casing 60. In this manner, rod seal 76 and bearing 102 will be automatically aligned as required with rod 22, the axial position of which within inner tube 30 is determined by strut base 40 and piston 24.

When the rod 22 is fully retracted, the piston 24 is located immediately adjacent to the rod guide and seal assembly 10 (i.e., the piston 24 is moved fully downwardly in FIG. 1). When the rod 22 is thus fully retracted, the bumper 25 (see FIG. 1) of the piston 24 may engage the outer casing 60. As the bumper 25 approaches the outer casing 60, it pushes fluid 32 through the central hole 61 in the flask 62. When the piston 24 fully engages the outer casing 60, the bumper 25 blocks off the central hole 61 in the flask 62. Accordingly, a fluid flow path is provided through the rod guide and seal assembly 10 to provide an exit path for fluid that is pushed through the central hole 61 immediately before the central hole 61 is blocked by the bumper 25. Providing an exit path for the fluid 32 helps to minimize spike pressure forces that may damage the compliant rod guide and seal assembly 10. The outer casing 60 is provided with a plurality of outer holes 120 located in the side wall 122 of the outer casing such that a fluid 32 can flow through the outer casing and return to the inner tube 30. In other words, fluid that is located in the central hole 124 of the support ring 70 can flow radially outwardly in a gap between the seal guard 80 and the support ring 70 to enter the gap 72, and then the fluid can flow from the gap 72 to exit assembly 10 through the outer holes 120.

Figure 6:
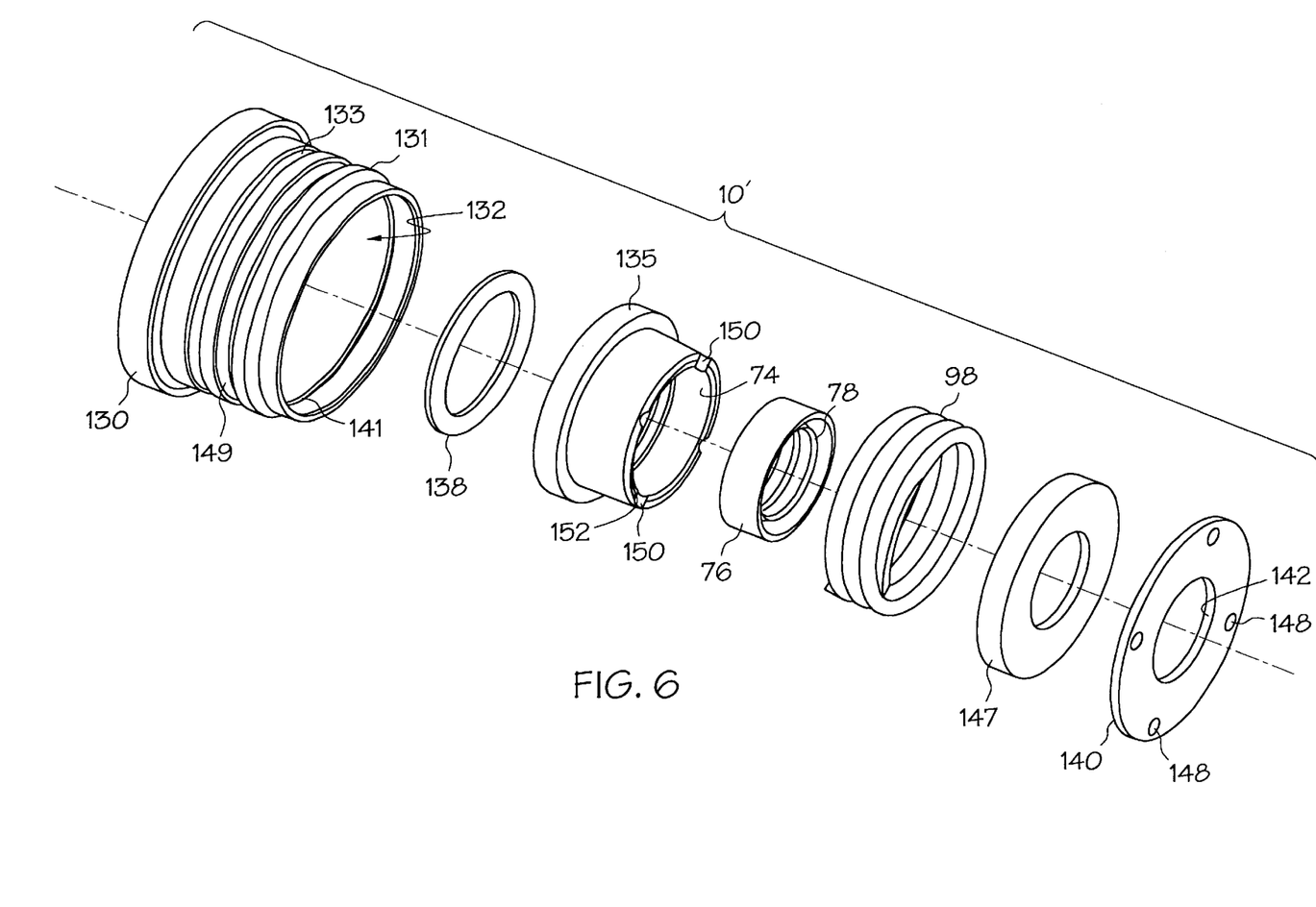
FIG. 6 is an exploded, perspective view of the compliant rod guide and seal assembly of FIG. 4.
Figure 7:
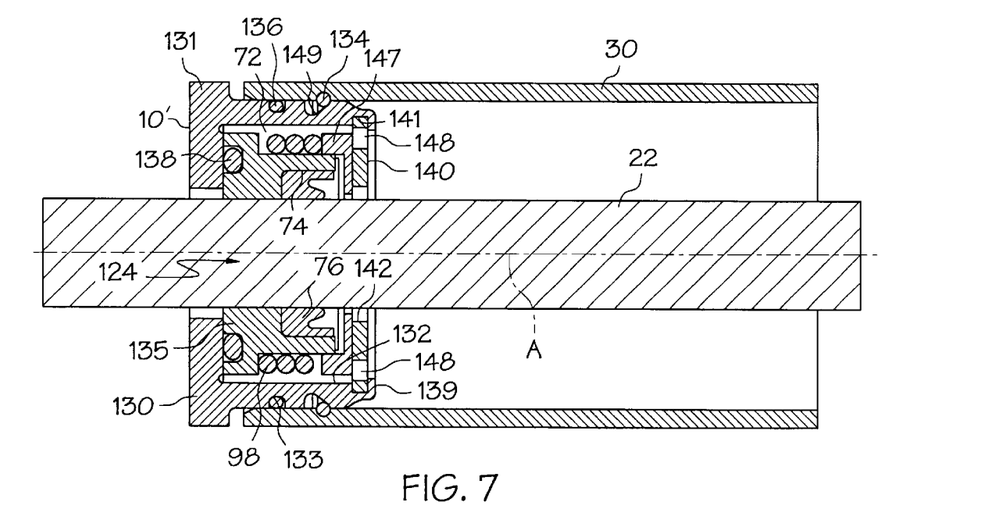
FIG. 7 is a side view in section of the compliant rod guide and seal assembly of FIG. 4 mounted in a strut tube and receiving a rod.
Figure 8:
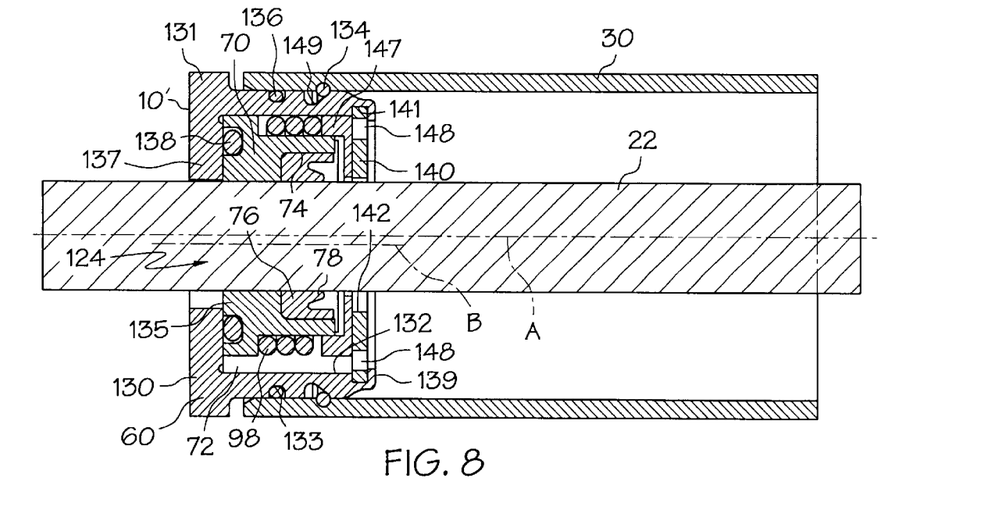
FIG. 8 is a side view in section of the compliant rod guide and seal assembly, strut tube and rod of FIG. 7, with the rod shifted laterally from the center of the strut tube.

An alternate embodiment 10' of the compliant rod guide and seal assembly of the present invention is shown in FIGS. 4–8. In this embodiment, the outer casing 131 includes a cylindrical base 130 having a central hole 132 which receives the support ring 135. The outer casing 131 includes an outer annular seal groove 133 that receives an outer seal 136 for forming a seal between the outer casing and the inner tube 30. The outer casing 131 also includes an outer annular ring groove 149 that receives a snap ring 134 for coupling the outer casing to inner tuber 30, as illustrated in FIG. 7. An intermediate seal 138 is located between the support ring 135 and the outer casing 131. The support ring 135 includes an annular groove 74 to receive the intermediate seal 76. As in the case of the embodiment of FIGS. 1–3, in the embodiment of FIGS. 4–8 the rod guide and seal assembly 10' can accommodate relative lateral movement of the rod 22. As shown in FIG. 8, when the rod 22 is shifted laterally, such that rod centerline A is offset from rod guide centerline B, the support ring 135 and seal guard 147 move laterally within the gap 72 in the outer casing 131.

The outer casing 131 also includes a retainer ring 140 received in an annular groove 141 in the cylindrical base 130, and retainer ring 140 comprises a radially inwardly-extending portion (retainer portion) of said outer casing. The retainer ring 140 is generally washer-shaped, and includes a central hole 142. The retainer ring 140 keeps the seal guard 147 and support ring 135 within the outer casing 60, and an inwardly-extending lip 139 on the outer casing retains the retaining ring in place. At the opposite end of the outer casing 131, the outer casing includes a radially-inwardly extending end portion 137 that engages the support ring 135. The support ring 135 is preferably made of a lubricated bearing material to provide a low frictional force, such that the rod 22 can be slidingly received in the support ring 135 without additional lubrication or bearings. In one embodiment, the support ring 135 is made from aluminum treated with a process that penetrates fluoropolymers into hardcoat anodizing. For example, the support ring 135 may be aluminum treated with a process provided by Nimet Industries of South Bend, Ind. under the trademark Nituff®. Thus, in the embodiment illustrated in FIGS. 4–8, the rod bearing 102 that was shown in the embodiment of FIGS. 2–3 is not needed, although such a rod bearing may be used if desired.

The retainer 140 includes a plurality of outer holes 148 that serve the same purpose as the outer holes 120 in the outer casing 60 of the previous embodiment. That is, the outer holes 148 provide a fluid flow path when the central hole 142 of the retainer 140 is blocked by the bumper 25 of the piston 24. Furthermore, as best shown in FIG. 6, the support ring 135 includes a plurality of grooves 150 on its forward end surface 152. The grooves 150 ensure that fluid is able flow from the central chamber 124 of the support ring 135 to the gap 72. Fluid can then flow from the gap 72 to the inner cylinder 30 through the outer holes 148 of the retainer 140. This fluid flow path provides a pressure relief path when the central hole 142 of the retainer ring 140 is blocked by the bumper 25.

Having described the invention in detail and by reference to the preferred embodiments, it will be apparent that modifications and variations thereof are possible without departing from the scope of the invention.

What is claimed is:

1. A compliant rod guide and seal assembly for use in a damper comprising:
    an annular outer casting having an inner radius defining an inner cavity;
    a support ring received in said inner cavity, said support ring having an outer radius less than the inner radius of said outer casing sufficient to form a gap between said support ring and said outer casing to allow relative lateral movement between said outer casing and said support ring;
    a rod seal received in said support ring for slidably receiving a rod therethrough, whereby said support ring and said rod seal can move radially in said outer casing to accommodate relative lateral movement of said rod; and
    a seal guard mounted over an end of said support ring adjacent to said rod seal to maintain said rod seal in said support ring, wherein said seal guard is located between said seal and said outer casting, and wherein said seal guard is attached to said support ring for movement therewith.

2. A compliant rod guide and seal assembly for use in a damper comprising:
    an annular outer casing having an inner radius defining an inner cavity;
    a support ring received in said inner cavity, said support ring having an outer radius less than the inner radius of said outer casing sufficient to form a gap between said support ring and said outer casing to allow relative lateral movement between said outer casing and said support ring; and
    a rod seal received in said support ring for slidably receiving a rod therethrough, whereby said support ring and said rod seal can move radially in said outer casing to accommodate relative lateral movement of said rod, wherein said outer casing includes a radially inwardly-extending portion having a central hole in fluid communication with said inner cavity, and wherein said outer casing includes at least one outer hole located in said radially inwardly-extending portion of said outer casing, said outer hole positioned to allow fluid to pass therethrough when said central hole of said radially inwardly-extending portion is sealed.

3. A compliant rod guide and seal assembly for use in a damper comprising:
    an annular outer casing having an inner radius defining an inner cavity;
    a support ring received in said inner cavity, said support ring having an outer radius less than the inner radius of said outer casing sufficient to form a gap between said support ring and said outer casing to allow relative lateral movement between said outer casing and said support ring;

a rod seal received in said support ring for slidably receiving a rod therethrough, whereby said support ring and said rod seal can move radially in said outer casing to accommodate relative lateral movement of said rod, wherein said outer casing includes a radially-inwardly extending end portion that engages a rear surface of said support ring and a radially-inwardly extending retainer portion that retains said support ring and said seal in said outer casing; and a spring located between said support ring and said retainer portion for urging said support ring against said radially-inwardly extending end portion of said outer casing.

4. A compliant rod guide and seal assembly for use in a damper comprising:

an annular outer casing having an inner radius defining an inner cavity;

a support ring received in said inner cavity, said support ring having an outer radius less than the inner radius of said outer casing sufficient to form a gap between said support ring and said outer casing to allow relative lateral movement between said outer casing and said support ring;

a rod seal received in said support ring for slidably receiving a rod therethrough, whereby said support ring and said rod seal can move radially in said outer casing to accommodate relative lateral movement of said rod, wherein said outer casing includes a seal groove on its outer surface for receiving a seal therein, and wherein said outer casing includes a snap ring groove on said outer surface for receiving a snap ring therein for coupling said outer casing to an inner surface of a tube.

5. The rod guide and seal assembly of claim 4 in combination with an inner tube of strut, wherein said rod guide and seal assembly is coupled to an inner surface of said inner tube by a snap ring received in said snap ring groove.

6. A compliant rod guide and seal assembly for use in a damper comprising:

an annular outer casing having an inner radius defining an inner cavity;

a support ring received in said inner cavity, said support ring having an outer radius less than the inner radius of said outer casing sufficient to form a gap between said support ring and said outer casing to allow relative lateral movement between said outer casing and said support ring;

a rod seal received in said support ring for slidably receiving a rod therethrough, whereby said support ring and said rod seal can move radially in said outer casing to accommodate relative lateral movement of said rod, wherein said outer casing includes a cylindrical portion having an annular groove on its inner surface, and wherein said outer casing includes a retainer received in said annular groove for retaining said support ring and said rod seal in said inner cavity.

7. The rod guide and seal assembly of claim 6 wherein said retainer is generally washer-shaped and includes a retainer opening to provide access to said inner cavity.

8. The rod guide and seal assembly of claim 7 wherein said retainer includes a plurality of outer opening that are located to allow fluid to pass therethrough when said retainer opening is blocked.

* * * * *